United States Patent
Recksiek (10) Patent No.: US 9,751,615 B2
(45) Date of Patent: Sep. 5, 2017

(54) AIRCRAFT WING AND AN AIRCRAFT COMPRISING SUCH AIRCRAFT WING

(71) Applicant: Airbus Operations GmbH, Hamburg (DE)

(72) Inventor: Martin Recksiek, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 35 days.

(21) Appl. No.: 14/699,085

(22) Filed: Apr. 29, 2015

(65) Prior Publication Data
US 2015/0321747 A1 Nov. 12, 2015

(30) Foreign Application Priority Data
May 9, 2014 (EP) .................................... 14167726

(51) Int. Cl.
| | | |
|---|---|---|
| *B64C 9/04* | (2006.01) | |
| *B64C 9/02* | (2006.01) | |
| *B64C 9/16* | (2006.01) | |
| *B64C 9/22* | (2006.01) | |
| *B64D 45/00* | (2006.01) | |

(52) U.S. Cl.
CPC .................. *B64C 9/04* (2013.01); *B64C 9/02* (2013.01); *B64C 9/16* (2013.01); *B64C 9/22* (2013.01); *B64D 2045/001* (2013.01)

(58) Field of Classification Search
CPC .... B64C 9/04; B64C 9/02; B64C 9/22; B64C 9/16
USPC ........................................................ 244/213
See application file for complete search history.

(56) References Cited

U.S. PATENT DOCUMENTS 3,785,594 A * 1/1974 Lee ........................... B64C 9/16
  244/216
4,248,395 A * 2/1981 Cole ......................... B64C 9/04
  244/216

(Continued)

FOREIGN PATENT DOCUMENTS

| CN | 101115655 A | 1/2008 |
| DE | 4107556 A1 | 5/1992 |

(Continued)

OTHER PUBLICATIONS

European Patent Office, European Search Report for European Patent Application No. 14167726.0 mailed Nov. 11, 2014.

(Continued)

*Primary Examiner* — Brian M O'Hara
*Assistant Examiner* — Keith L Dixon
(74) *Attorney, Agent, or Firm* — Lorenz & Kopf LLP (57) ABSTRACT

An aircraft wing comprising a main wing, a high lift element, and at least two spaced connecting systems for moveably connecting the high lift element to the main wing, wherein each connecting system comprises a track element provided on the main wing, and having a first support surface and a first track side wall, an actuator device, a drive rod, and a carriage device connected to the high lift element and having an engagement portion. The object is to provide an aircraft wing which is configured in such a manner that when the connecting system for connecting the high lift element to the main wing fails the high lift element can still be held in a possibly unskewed position.

14 Claims, 5 Drawing Sheets

(56) References Cited

U.S. PATENT DOCUMENTS

| | | | | |
|---|---|---|---|---|
| 4,471,928 A * | 9/1984 | Cole | ............ | B64C 9/00 |
| | | | | 244/215 |
| 4,995,575 A * | 2/1991 | Stephenson | ............... | B64C 9/16 |
| | | | | 244/216 |
| 8,474,762 B2 * | 7/2013 | Peirce | ...................... | B64C 9/22 |
| | | | | 244/213 |
| 9,102,398 B2 * | 8/2015 | Vaghela | .................. | B64C 13/28 |
| 2013/0126670 A1 | 5/2013 | Vaghela | | |

FOREIGN PATENT DOCUMENTS

| | | |
|---|---|---|
| EP | 0503158 A1 | 12/1991 |
| EP | 2284077 A2 | 2/2011 |
| WO | 2005077756 A1 | 8/2005 |

OTHER PUBLICATIONS

People's Repubic of China, Chinese Office Action for Chinese Patent Application No. 201510236360.6 dated Sep. 13, 2016.

* cited by examiner

AIRCRAFT WING AND AN AIRCRAFT COMPRISING SUCH AIRCRAFT WING

CROSS-REFERENCE TO RELATED APPLICATION

This application claims priority to European Patent Application No. 14167726.0 filed May 9, 2014, which is incorporated herein by reference in its entirety.

TECHNICAL FIELD

The subject matter described herein relates to an aircraft wing comprising a main wing, a high lift element, and at least two spaced connecting systems for movably connecting the high lift element to the main wing. The high lift element within the meaning of the present embodiment may be any kind of high lift element having a high lift surface, such as a high lift flap or a high lift slat. The at least two connecting systems are spaced apart from one another in the spanwise direction of the aircraft wing. Each connecting system comprises a track element, an actuator device, a drive rod, and a carriage device.

BACKGROUND

The track element is provided on the main wing, preferably on an upper surface of a structure element of the main wing, and extends in a chordwise direction of the wing. The structure element may be arranged under the skin of the main wing, but may also be arranged outside of said skin or extending through said skin. The track element has at least a first support surface and at least a first track side wall extending transverse to the first support surface. The first support surface preferably extends in parallel to the upper surface of the structure element of the main wing.

The actuator device is provided on the main wing and configured for moving the high lift element relative to the main wing in order to adjust the geometry of the aircraft wing, and thus to adjust the resulting lift of the aircraft wing. The actuator device may be formed as e.g. a rotary drive.

The drive rod has an element end which is, preferably in a pivotal manner, connected to the high lift element, and an actuator end that is, preferably in a pivotal manner, connected to the actuator device. In such a manner the drive rod connects the actuator device to the high lift element and transfers movement of the actuator device to the high lift element.

The carriage device is, preferably in a pivotal manner, connected to the high lift element and has an engagement portion that engages the track element in such a manner that a linear movement of the engagement portion along the track element is permitted. This linear movement is guided by the drive rod, or by the track element during engagement of the engagement portion of the carriage device to the track element.

In the prior art, the engagement portion of the carriage device comprises one or more rollers, usually four rollers that are spaced from each other in-line and in parallel, which engage the first support surface of the track element in order to be moved along the track element supported by the first support surface.

Undesirable and dangerous situations may arise when during flight, take off, or landing of an aircraft one of the connecting systems fail, e.g. by fracture of the drive rod, the actuator device, or one of the hinges connecting the drive rod to the actuator device or to the high lift element. In these cases one of the load paths from the high lift element to the main wing is interrupted, so that the high lift element skews with respect to the main wing and with respect to possible further high lift elements, which could interfere with the operation of the high lift element.

Therefore, there are aircraft wings known in the art that are configured in a fail-safe manner such that, when one of the connecting systems connecting the high lift element to the main wing fails, the high lift element is still kept in its position relative to the main wing and to possible further high lift elements and is not skewed with respect to the main wing by more than a certain uncritical tolerance.

One option known in the art to prevent the interfered operation of the high lift element mentioned above after failure of one of the connecting systems is to interconnect two adjacent high lift elements by means of an interconnecting device, so that when one of the connecting systems fails the high lift element is still held in place by the remaining connecting system and the interconnecting device connected to the adjacent high lift element. However, such interconnecting device can only be employed between high lift elements that are configured to operate in common, i.e. move simultaneously, as it is the case for high lift systems employing a central transmission shaft to which each of the high lift elements are coupled for common movement.

However, in an increasing number of aircraft models it is desired to configure the high lift systems in such a manner that each high lift element may be controlled and moved individually without a central transmission shaft moving all high lift elements commonly, but instead with separate transmission shafts and actuator devices each of which are responsible for movement of a single high lift element independent from the other high lift elements. For such independently actuated high lift elements it is known in the art to provide a so called fail safe connecting system connecting the high lift element to the main wing. Such fail safe connecting systems include a safety or backup connection, such as a safety rod, connecting the high lift element to the main wing in addition to the usual drive rod, so that when e.g. the drive rod fails, the high lift element is still held in position by the safety connection.

However, such fail safe connecting systems are disadvantageous, because the safety connection consumes additional space on the main wing and on the high lift element, and carries additional weight, which is generally desired to be reduced in aircraft construction.

Therefore, the object of the present embodiments described herein is to provide an aircraft wing that is configured in such a manner that when the connecting system for connecting the high lift element to the main wing fails, the high lift element can still be held in a possibly unskewed position, and wherein at the same time, possibly little additional room is consumed and possibly little additional weight is introduced in the aircraft wing.

This object is achieved by the engagement portion comprising a bearing including a slide bearing, the bearing having a first bearing surface and a first bearing side wall extending transverse to the first bearing surface, wherein the first bearing surface is supported by and adapted to move along the corresponding first support surface of the track element. The bearing and the track element engage in such a manner that when the bearing or slide bearing is aligned with the track element the first track side wall and the first bearing side wall are spaced apart from each other so that the linear movement of the carriage device along the track element is permitted, and when the bearing or slide bearing is skewed with respect to the track element the first bearing side wall contacts the first track side wall so that the bearing or slide bearing is locked against the track element and movement of the carriage device along the track element is inhibited.

In other words, when the bearing and the track element are engaged, the bearing can be moved relative to the track element between an aligned position taken during normal operation of the high lift element, where the bearing is aligned with respect to the direction of extension of the track element, and a skewed position taken after failure of one of the connecting systems, where the bearing is skewed with respect to the direction of extension of the track element.

When the bearing is in the aligned position, the first track side wall and the first bearing side wall are spaced from each other by a, preferably constant, gap, so that the linear movement of the carriage device, i.e. the engagement portion, along the track element is possible. The lower limit of the size of the gap is defined by the precondition that in the aligned position of the bearing relative movement between the bearing and the track element in the direction along the track element is possible. The upper limit of the size of the gap is defined by the length of the diagonal or longest diameter of the bearing. The preferred size of the gap is located between the upper and lower limit but considerably closer to the lower limit, since it is desired to lock the high lift element in a skewed position with a possibly small skew angle.

In the skewed position of the bearing, the first bearing side wall contacts the first track side wall so that the bearing is locked against the track element and further linear movement of the carriage device along the track element as well as further skewing is inhibited. The locking of the bearing against the track element can mean that the bearing is fixed in its position and may be moved neither such that the skew angle is increased, nor such that the skew angle is decreased. It can also mean that merely no further skewing, i.e. increasing of the skew angle is possible, but a movement in order to decrease the skew angle would indeed be possible.

By means of the bearing that can be moved between an aligned position and a skewed position as described herein, a very simple and effective way of locking a high lift element in a fixed position after failing of one of the connecting systems, e.g. by rupturing of one of the drive rods, is provided. After rupture of a drive rod, the associated high lift element is skewed due to the aerodynamic loads on the high lift element and the missing or interrupted load path represented by the ruptured drive rod. The skewing of the high lift element causes a skewing of the attached bearing with respect to the track element of the connecting system of the ruptured drive rod. When the slide bearing is skewed by a certain angle with respect to the track element, the first bearing side wall contacts and locks against the first track side wall so that no further movement of the bearing along the track element, and thus no further skew angle is possible. The high lift element is held in its stable position until landing of the aircraft, where the broken connecting system can be repaired. No relevant further weight is introduced and no relevant further space is required for such a connecting system as described herein.

In a simple embodiment, all or just a part of the rollers of the carriage device of an aircraft wing known in the art are replaced by slide bearings.

According to a preferred embodiment, the track element comprises a second track side wall, and the bearing comprises a second bearing side wall. The bearing or slide bearing and the track element engage in analogous manner as described before in connection with the first track side wall and the first bearing side wall. When the bearing or slide bearing is aligned with the track element, the second track side wall and the second bearing side wall are spaced from each other so that the linear movement of the carriage device along the track element is permitted. When the bearing or slide bearing skewed is with respect to the track element, the second bearing side wall contacts the second track side wall so that the bearing or slide bearing is locked against the track element, and movement of the carriage device along the track element is inhibited.

By introducing the second track side wall and the second bearing side wall, a more effective locking of the bearing against the track element can be established, wherein it is preferred that the first track side wall and the second track side wall are provided on opposite sides of the track element, and the first bearing side wall and the second bearing side wall are provided on opposite sides of the slide bearing.

In particular, it is preferred that the bearing is formed as the slide bearing, and the first bearing surface is formed as a first slide surface adapted to slide along the corresponding first support surface of the track element. In other words, the bearing has no other components but the slide bearing. Therefore, the first bearing surface must be formed as a first slide surface.

In particular, it is preferred that the first track side wall and the second track side wall are arranged in a track recess of the track element in an opposite manner such that their surfaces point to one another. The first bearing side wall and the second bearing side wall are arranged on a bearing projection of the slide bearing in an opposite manner such that their surfaces point away from one another. It is further preferred that the first support surface is arranged on the bottom side of the track recess, and the first slide surface is arranged on the front side of the bearing projection.

In such a manner, the slide bearing can effectively be guided on the track element and, when skewed, effectively be locked against the track element.

In an alternative embodiment, the first track side wall and the second track side wall are arranged on a track projection of the track element in an opposite manner such that their surfaces point away from one another. The first bearing side wall and the second bearing side wall are arranged in a bearing recess of the slide bearing in an opposite manner such that their surfaces point to one another. It is further preferred that the first support surface is arranged on the front side of the track projection, and the first slide surface is arranged on the bottom side of the bearing recess.

In such a manner, the slide bearing can effectively be guided along the track element and, when skewed, effectively be locked against the track element.

Alternatively, it is preferred that the first support surface is arranged on the track element adjacent the track projection on a first side of the track projection. A second support surface is arranged on the track element adjacent the track projection on a second side of the track projection opposite the first side. The bearing recess is defined between a first bearing projection portion and a second bearing projection portion. The first slide surface is arranged on the front side of the first bearing projection portion. A second slide surface is arranged on the front side of the second bearing projection portion. The second slide surface is adapted to slide along the corresponding second support surface. In such a manner the slide bearing can slide along the track element in a very stable manner and at the same time, when skewed, be locked against the track element most effectively.

According to a preferred embodiment the bearing comprises the slide bearing for transferring loads in the plane in which the aircraft wing mainly extends, and a roller arrangement for transferring loads transverse to the plane in which the aircraft wing mainly extends. The roller arrangement has at least a first roller element, wherein the peripheral surface of the first roller element comprises the first bearing surface. The slide bearing comprises a first slide element having the first bearing side wall, and a second slide element having the second bearing side wall. The first slide element and the second slide element are preferably formed as a friction pad, and are arranged in an opposite manner such that the first bearing side wall and the second bearing side wall point to one another.

In particular, it is preferred that the track element has a T-shaped cross section including a lower portion and an upper portion. The lower portion is connected to the main wing and extends away from the upper surface of the structure element of the main wing. The upper portion extends in parallel to the upper surface of the structure element and has a top surface pointing away from the upper surface of the structure element, a bottom surface pointing to the upper surface of the structure element, as well as first and second side surfaces pointing away from each other and connecting the top surface to the bottom surface.

The top surface comprises the first support surface. The roller arrangement has a second roller element, the peripheral surface of which comprises a second bearing surface, and a third roller element the peripheral surface of which comprises a third bearing surface. The bottom surface comprises a second support surface on a first side of the lower portion and a third support surface on a second side of the lower portion opposite the first side.

The second bearing surface is supported by and adapted to move along the corresponding second support surface, and the third bearing surface is supported by and adapted to move along the corresponding third support surface. The first side surface comprises the first track side wall, and the second side surface comprises the second track side wall.

Further, it is preferred that the roller arrangement comprises a fourth roller element that is arranged in line with the first roller element, a fifth roller element that is arranged in line with the second roller element, and a sixth roller element that is arranged in line with the third roller element. The lines extend in parallel to the track element. First and second slide elements are arranged, preferably centrally, between the first, second, and third roller elements on the one hand, and the fourth, fifth, and sixth roller elements on the other hand.

By a an aircraft wing having a bearing and a track element formed in accordance with the afore-described embodiments, a particularly effective guiding on the one hand and blocking on the other hand can be established.

According to a preferred embodiment, a first ratchet mechanism is provided between the first track side wall and the first bearing side wall. The ratchet mechanism comprises a first ratchet component mounted to the first track side wall and a second ratchet component mounted to the first bearing side wall. The first ratchet component and the second ratchet component are adapted to engage in a direction of engagement when the first bearing side wall contacts the first track side wall, such that upon engagement a relative movement of first and second ratchet component opposite the direction of engagement is inhibited.

In particular, it is preferred that a second ratchet mechanism is provided between the second track side wall and the second bearing side wall. The second ratchet mechanism comprises a third ratchet component mounted to the second track side wall and a fourth ratchet component mounted to the second bearing side wall. The third ratchet component and the fourth ratchet component are adapted to engage in a direction of engagement, when the second bearing side wall contacts the second track side wall, such that upon engagement a relative movement of third and fourth ratchet component opposite the direction of engagement is inhibited.

By the first and/or the second ratchet mechanism, the slide bearing, and thus, the high lift element, can be locked in the skewed position, where the first track side wall contacts the first bearing side wall and/or the second track side wall contacts the second bearing side wall, also with respect to a backwards direction out of the skewed position in the aligned position, i.e. opposite the direction of engagement of the associated first and second or third and fourth ratchet components. In this, it can be ensured that when one of the connecting systems fails during flight and the high lift element is skewed and then locked in the skewed position by the first bearing side wall contacting and engaging the first track side wall and the second bearing side wall contacting and engaging the second track side wall, the high lift element, which during flight is under permanent aerodynamic loading, may not move backwards, i.e. out of the skewed position into the aligned position or even vibrating between the skewed and the aligned position, which could cause further damage to the high lift element and to the entire wing.

According to a further embodiment, at least one of the first and second track side wall and the first and second bearing side wall is provided with an anti-slip surface. By such an anti-slip surface of the first or second track side wall or the first or second bearing side wall, when the first bearing side wall contacts the first track side wall and/or the second bearing side wall contacts the second track side wall, the slide bearing is effectively locked in the skewed position by a friction force between the first bearing side wall and first track side wall and/or second bearing side wall and second track side wall. Such anti-slip surface may be established in various ways, e.g. by a certain surface roughness or by an anti-slip coating.

A further aspect of the embodiment relates to an aircraft comprising a wing according to any of the afore-described embodiments. All features and advantages described before in connection with the wing in the same way apply to the aircraft.

BRIEF DESCRIPTION OF THE DRAWINGS

The various embodiments will hereinafter be described in conjunction with the following drawing figures, wherein like numerals denote like elements, and.

DETAILED DESCRIPTION

The following detailed description is merely exemplary in nature and is not intended to limit the disclosed embodiments or the application and uses thereof. Furthermore, there is no intention to be bound by any theory presented in the preceding background detailed description.

Figures 1, 2:
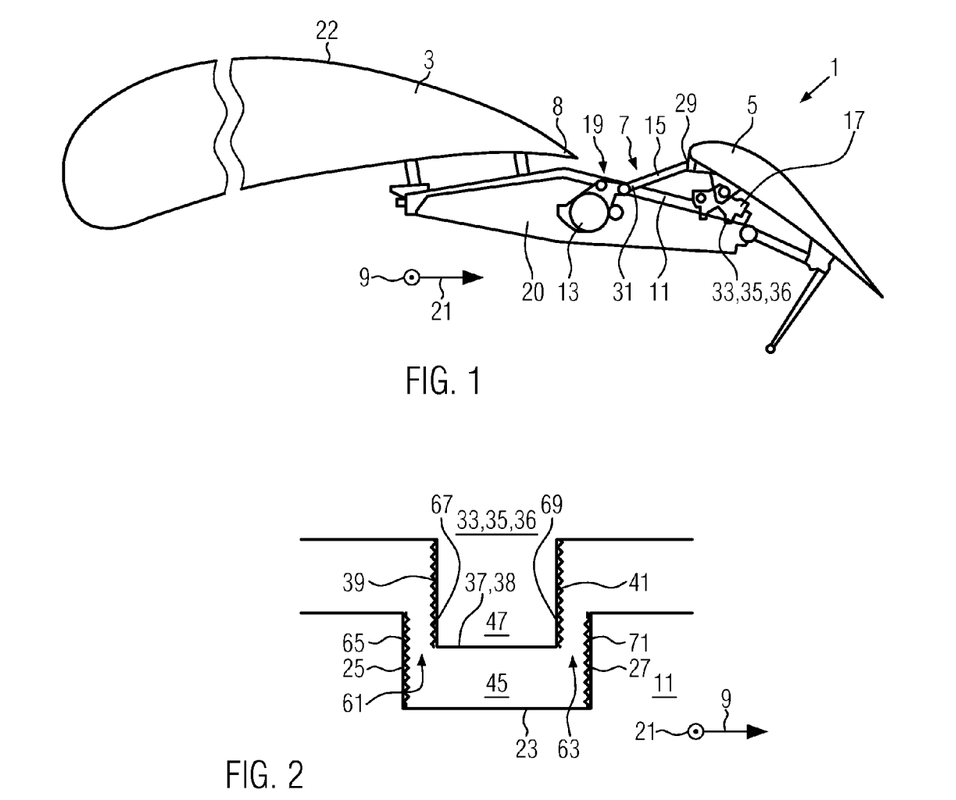
FIG. 1 is a cross-sectional view of an embodiment of an aircraft wing according to the present embodiment.
FIG. 2 is a cross-sectional view of an engagement portion of a carriage device engaging a track element of an aircraft wing according to an embodiment, wherein a bearing projection engages a track recess.

In FIG. 1, an embodiment of the aircraft wing 1 is illustrated. The aircraft wing 1 comprises a main wing 3, a high lift element 5, and two connecting systems 7 connecting the high lift element 5 to the main wing 3.

The high lift element 5 in the present embodiment is a high lift flap arranged at a trailing edge 8 of the main wing 3, in particular a Fowler flap, but may also be a leading edge slat. The connecting systems moveably connect the high lift element 5 to the main wing 3, and are arranged spaced apart from one another in the spanwise direction 9 of the aircraft wing 1.

Figure 3:
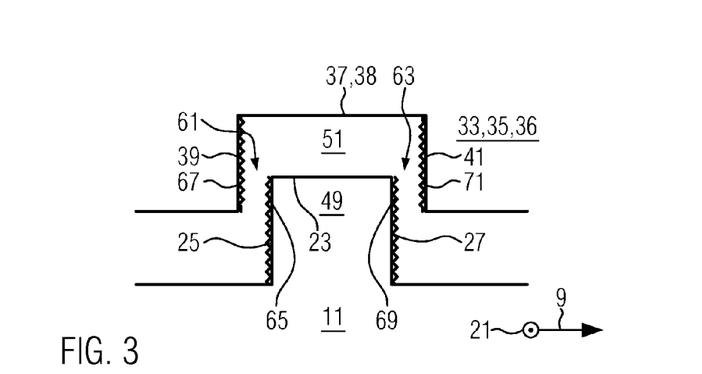
FIG. 3 is a cross-sectional view of an engagement portion of a carriage device engaging a track element of an aircraft wing according to an embodiment, wherein a track projection engages a bearing recess.
Figure 4:
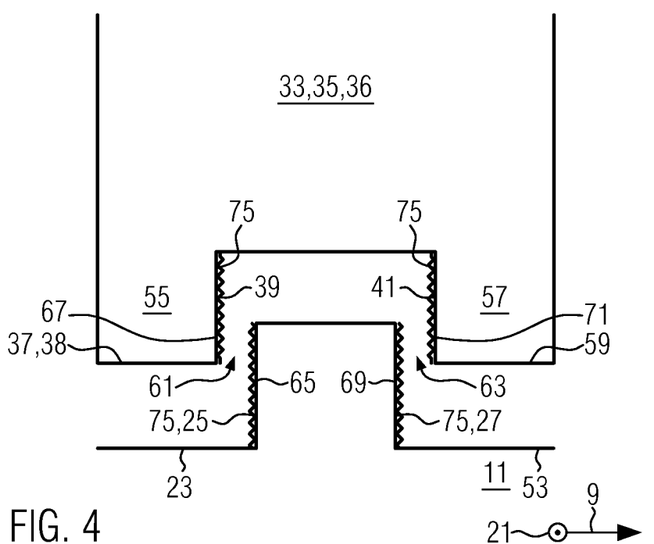
FIG. 4 is a cross-sectional view of an engagement portion of a carriage device engaging a track element of an aircraft wing according to an embodiment, wherein a track projection engages a bearing recess formed between a first and a second bearing projection portion.

Each connecting system 7 comprises a track element 11, an actuator device 13, a drive rod 15, and a carriage device 17. The track element 11 is provided on the upper surface 19 of a structure element 20 of the main wing 3 and extends in a chordwise direction 21 of the aircraft wing 1. The structure element 20 is arranged outside of the skin 22 of the main wing 3 near the trailing edge 8, in particular below and behind the trailing edge 8, and is connected to the support structure of the main wing 3 underneath the skin 22. The track element 11 further has a first support surface 23, a first track side wall 25, and a second track side wall 27, wherein first and second track side walls 25 and 27 extend transverse to the first support surface 23 and opposite to one another, as it is illustrated in FIGS. 2 to 4. The actuator device 13 is provided on the main wing 3 and configured to move the high lift element 5 relative to the main wing 3 by a rotating movement of the actuator device 13. The drive rod 15 has an element end 29 that is pivotally connected to the high lift element 5 and an actuator end 31 that is pivotally connected to the actuator device 13, so that the drive rod 15 transfers the movement of the actuator device 13 to the high lift element 5. The carriage device 17 is pivotally connected to the high lift element 5 and has an engagement portion 33 engaging the track element 11 so that a linear movement of the engagement portion 33 along the track element 11 is possible.

As shown in FIGS. 2 to 4, the engagement portion 33 comprises a bearing 35, which is formed as a slide bearing 36, having a first bearing surface 37 that is formed as first slide surface 38, a first bearing side wall 39, a second bearing side wall 41, and first and second bearing side walls 39, 41 extending transverse to the first slide surface 38 and opposite to one another. The first slide surface 38 is adapted to slide along the corresponding first support surface 23 of the track element 11.

FIGS. 2 to 4 illustrates different embodiments of the slide bearing 36 and the track element 11, that are described hereafter.

As shown in FIG. 2, the first track side wall 25 and the second track side wall 27 may be arranged in a track recess 45 formed in the track element 11 on opposite sides of the track recess 45 so that the surface of the first track side wall 25 and the surface of the second track side wall 27 point to one another. At the same time, the first bearing side wall 39 and the second bearing side wall 41 are arranged on opposite sides of a bearing projection 47 formed on the slide bearing 36 and adapted to engage the track recess 45, wherein the surface of the first bearing side wall 39 and the surface of the second bearing side wall 41 point away from one another. The first support surface 23 is arranged on the bottom side of the track recess 45, wherein the first slide surface 38 is arranged on the front side of the bearing projection 47, so that during engagement of the bearing projection 47 and the track recess 45 the first slide surface 38 rests against the first support surface 23, adapted to slide along the first support surface 23.

As illustrated in FIG. 3, the first track side wall 25 and the second track side wall 27 may alternatively be arranged on opposite sides of a track projection 49 formed on the track element 11, wherein the surface of the first track side wall 25 and the surface of the second track side wall 27 point away from one another. At the same time, the first bearing side wall 39 and the second bearing side wall 41 are arranged on opposite sides of a bearing recess 51 formed in the slide bearing 36, so that the surface of the first bearing side wall 39 and the surface of the second bearing side wall 41 point to one another. The first support surface 23 is arranged on the front side of the track projection 49, wherein the first slide surface 38 is arranged on the bottom side of the bearing recess 51, so that during engagement of the track projection 49 to the bearing recess 51 the first slide surface 38 rests against the first support surface 23, adapted to slide along the first support surface 23. Thus, the embodiment of FIG. 3 represents a reversed form of the embodiment of FIG. 2.

The embodiment shown in FIG. 4 is similar to the embodiment of FIG. 3, wherein the first support surface 23 is arranged on a first side of the track projection 49 on the track element 11 adjacent to the track projection 49. At the same time a second support surface 53 is arranged on the track element 11 on a second side of the track projection 49 opposite the first side, adjacent to the track projection 49. The bearing recess 51 is defined between a first bearing projection portion 55 comprising the first slide surface 38 on its front side, and a second bearing projection portion 57 comprising a second slide surface 59 on its front side. The track projection 49 and the bearing recess 51 engage in such a manner that the first slide surface 38 rests against the first support surface 23, adapted to slide along the first support surface 23, and the second slide surface 59 rests against the second support surface 53, adapted to slide along the second support surface 53.

Figure 5:
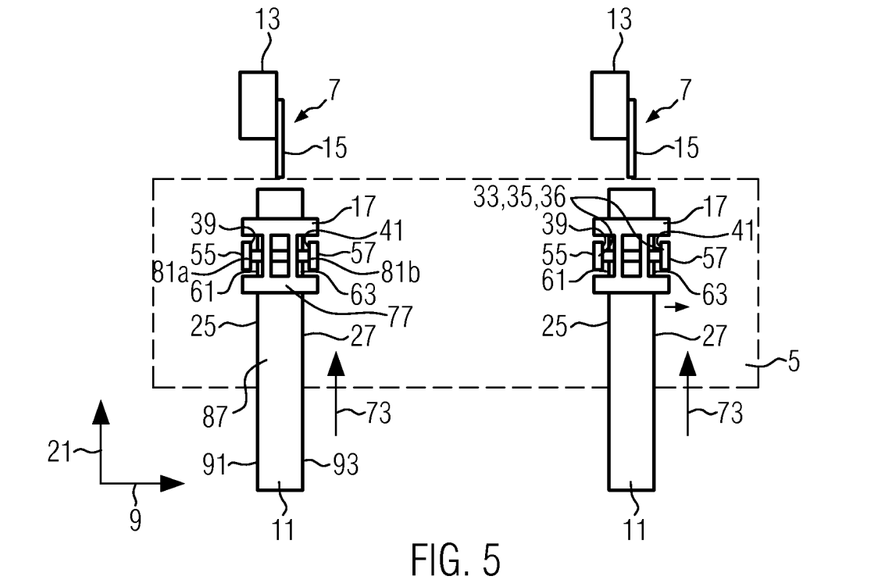
FIG. 5 is a top view of a high lift element connected to two separate connecting systems of an aircraft wing according to the embodiment of FIG. 4.
Figure 6:
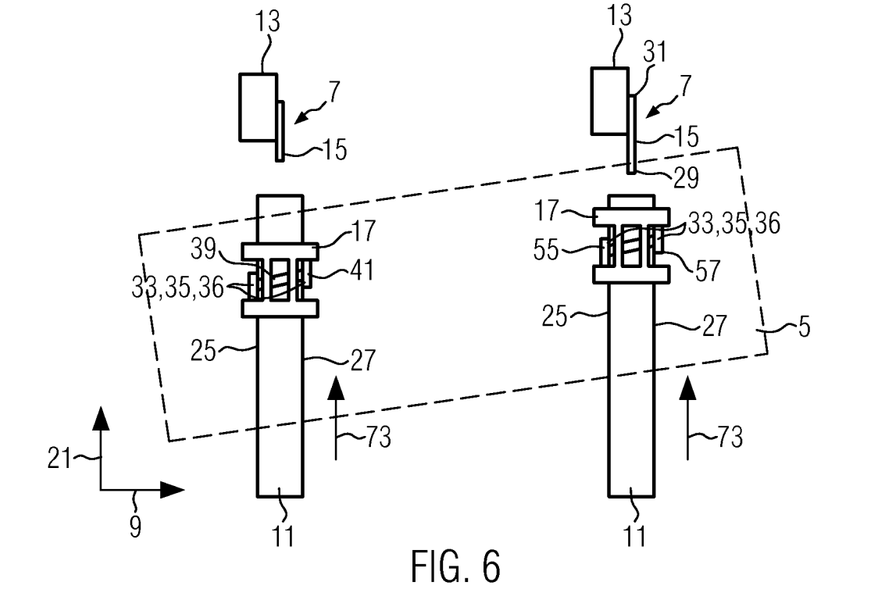
FIG. 6 is a top view of a high lift element connected to two separate connecting systems of an aircraft wing according to the embodiment of FIG. 5, wherein a drive rod of one of the connecting systems is ruptured.

However, in all these three embodiments shown in FIGS. 2 to 4, the slide bearing 36 and the track element 11 engage in such a manner that, when the slide bearing 36 is aligned with the track element 11, the first track side wall 25 and the first bearing side wall 39 are spaced from each other and the second track side wall 27 and the second bearing side wall 41 are spaced from each other, so that linear movement of the carriage device 17 along the track element 11 is permitted (see FIG. 5). In turn, when the slide bearing 36 is skewed with respect to the track element 11, the first bearing side wall 39 contacts the first track side wall 25 and the second bearing side wall 41 contacts the second track side wall 27, so that the slide bearing 36 is locked against the track element 11 and movement of the carriage device 17 along the track element 11 is inhibited (see FIG. 6).

Figure 7:
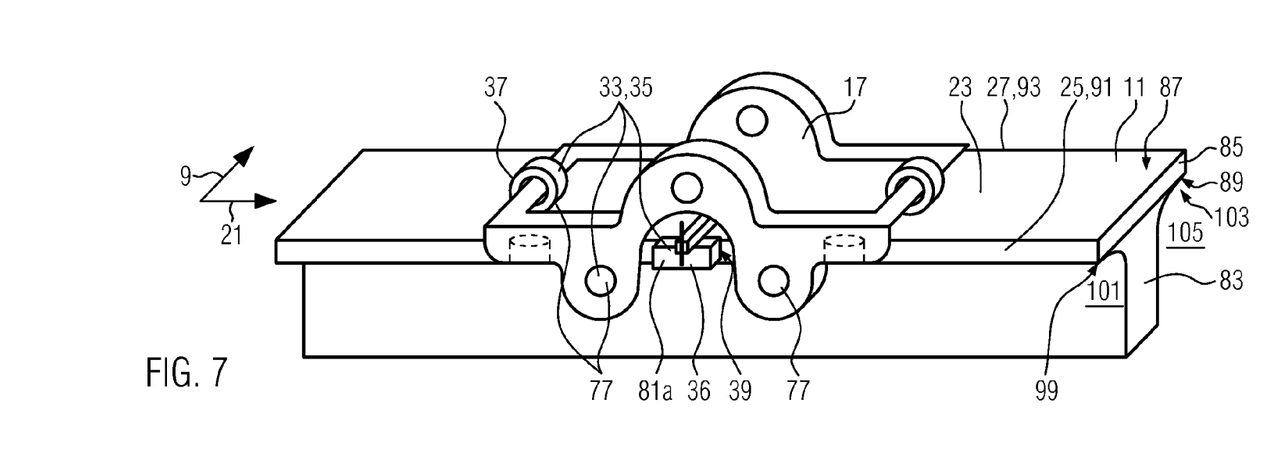
FIG. 7 is a perspective view of a carriage device engaging a track element of an aircraft wing according to an embodiment.
Figure 8:
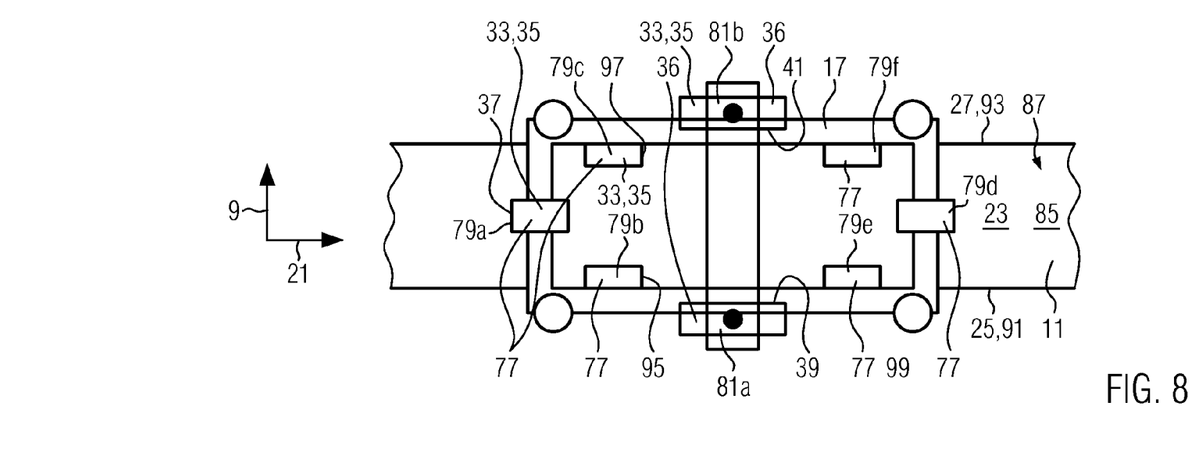
FIG. 8 is a top view of the carriage device engaging the track element as shown in FIG. 7.
Figure 9:
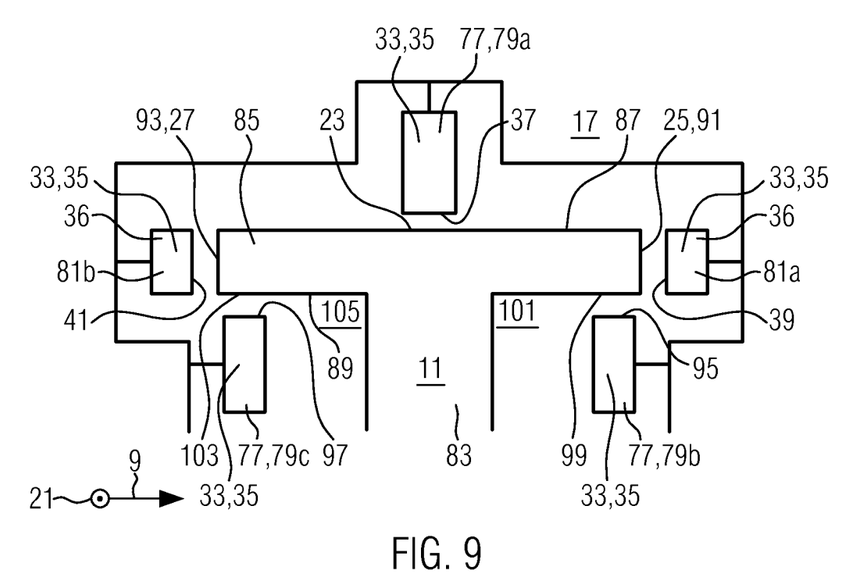
FIG. 9 is a cross sectional view of the carriage device engaging the track element as shown in FIG. 7.

A further embodiment of the bearing 35 in combination with the track element 11 is illustrated in FIGS. 7 to 9 in more detail.

The bearing 35 comprises the slide bearing 36 and a roller arrangement 77. The roller arrangement 77 has a first roller element 79a, wherein the peripheral surface of the first roller element 79 comprises the first bearing surface 37. The slide bearing 36 comprises a first slide element 81a having the first bearing side wall 39, and a second slide element 81b having the second bearing side wall 41. The first slide element 81a and the second slide element 81b are formed as a friction pad, and are arranged in an opposite manner such that the first bearing side wall 39 and the second bearing side wall 41 point to one another.

The track element 11 has a T-shaped cross section including a lower portion 83 and an upper portion 85. The lower portion 83 is connected to the main wing 3 and extends away from the upper surface 19 of the structure element 20 of the main wing 3. The upper portion 85 extends in parallel to the upper surface 19 of the structure element 20 and has a top surface 87 pointing away from the upper surface 19 of the structure element 20, a bottom surface 89 pointing to the upper surface 19 of the structure element 20, as well as first and second side surfaces 91, 93 pointing away from each other and connecting the top surface 87 to the bottom surface 89.

The top surface 87 comprises the first support surface 23. The roller arrangement 77 has a second roller element 79b the peripheral surface of which comprises a second bearing surface 95, and a third roller element 79c the peripheral surface of which comprises a third bearing surface 97. The bottom surface 89 comprises a second support surface 99 on a first side 101 of the lower portion 83 and a third support surface 103 on a second side 105 of the lower portion 83 opposite the first side 101.

The second bearing surface 95 is supported by and adapted to move along the corresponding second support surface 99, and the third bearing surface 97 is supported by and adapted to move along the corresponding third support surface 103. The first side surface 91 comprises the first track side wall 25 and the second side surface 93 comprises the second track side wall 27.

The roller arrangement 77 comprises a fourth roller element 79d that is arranged in line with and formed analogically to the first roller element 79a, a fifth roller element 79e that is arranged in line with and formed analogically to the second roller element 79b, and a sixth roller element 79f that is arranged in line with and formed analogically to the third roller element 79c. The lines extend in parallel to the track element 11. First and second slide elements 81a, 81b are arranged centrally between the first, second and third roller elements 79a-c on the one hand, and the fourth, fifth and sixth roller elements 79d-f on the other hand, such that the carriage device 17 is formed with respect to both the spanwise direction 9 and the chordwise direction 21 of the aircraft wing 1.

In the described embodiments, a first ratchet mechanism 61 is provided between the first track side wall 25 and the first bearing side wall 39, and a second ratchet mechanism 63 is provided between the second track side wall 27 and the second bearing side wall 41. The first ratchet mechanism 61 comprises a first ratchet component 65 mounted to the first track side wall 25 and a second ratchet component 67 mounted to the first bearing side wall 39. The second ratchet mechanism 63 comprises a third ratchet component 69 mounted to the second track side wall 27 and a fourth ratchet component 71 mounted to the second bearing side wall 41. The first ratchet component 65 and the second ratchet component 67 are adapted to engage in a direction of engagement 73. Similarly, the third ratchet component 69 and fourth ratchet component 71 are adapted to engage in the direction of engagement 73.

When the bearing 35 is skewed with respect to the track element 11, the first bearing side wall 39 contacts the first track side wall 25 and the second bearing side wall 41 contacts the second track side wall 27, such that the first ratchet component 65 engages to the second ratchet component 67 and the third ratchet component 69 engages to the fourth ratchet component 71, and upon the engagement a relative movement of the first ratchet component 65 and the second ratchet component 67, as well as the third ratchet component 69 and the fourth ratchet component 71, opposite the direction of engagement 73 is inhibited.

Further, the first and second track side walls 25 and 27, as well as the first and second bearing side walls 39 and 41 are provided with an anti-slip surface 75, so that upon contact of the first track side wall 25 to the first bearing side wall 39 and the second track side wall 27 to the second bearing side wall 41, any further movement of the bearing 35 with respect to the track element 11 is inhibited by a friction force present between the anti-slip surfaces 75 of first and second track side walls 25, 27 and first and second bearing side walls 39, 41.

The aircraft wing 1 can be used in the following manner. The high lift element 5 can be moved relative to the main wing 3 by means of the connecting systems 7 in order to adjust the lift of the aircraft wing 1, e.g. during take-off or landing. In the event that during flight, when high aerodynamic loads are applied to the high lift element 5, a part of the connecting system 7 fails, such as in the case of rupture of the drive rod 15, the high lift element 5 is skewed by the aerodynamic loading and by the fact that one of the load paths to the main wing 3 are interrupted due to fracture of the drive rod 15. However, the skewing of the high lift element 5 is limited by the first bearing side wall 39 contacting the first track side wall 25 and the second bearing side wall 41 contacting the second track side wall 27, when the bearing 35 is skewed with respect to the track element 11.

In such a manner, the position of the bearing 35 with respect to the track element 11 is locked and the bearing 35, and thus the high lift element 5, can neither be moved any further in a more skewed position, nor can it be moved backwards in a less skewed position, as this is prevented by the first and/or second ratchet mechanisms 61, 63 that are engaged during skewing of the bearing 35 relative to the track element 11. In such a manner, even when one of the connecting systems 7 fails, the high lift element 5 is fixed in a slightly but not dangerously skewed position relative to the main wing 3 and relative to possible further high lift elements and no vibrations or movement back and forth of the high lift element 5 is possible, which could lead to additional damage or rupture of the entire high lift element 5.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. An aircraft wing comprising:
a main wing,
a high lift element, and
at least two spaced connecting systems for moveably connecting the high lift element to the main wing, wherein each connecting system comprises
a track element fixedly mounted to the main wing, and having a first support surface and a first track side wall extending transverse to the first support surface,
an actuator device provided on the main wing for moving the high lift element relative to the main wing,
a drive rod having an element end connected to the high lift element, and an actuator end connected to the actuator device, and
a carriage device mounted to the high lift element and having an engagement portion engaging the track element in such a manner that a linear movement of the engagement portion along the track element is permitted,
characterized in that
the engagement portion comprises a bearing including a slide bearing, the bearing having a first bearing surface and a first bearing side wall extending transverse to the first bearing surface, wherein the first bearing surface is supported by and adapted to move along the corresponding first support surface of the track element,
wherein the bearing and the track element engage in such a manner that,
when the bearing is aligned with the track element the first track side wall and the first bearing side wall are spaced from each other so that the linear movement of the carriage device along the track element is permitted, and
when the bearing is skewed with respect to the track element, the first bearing side wall contacts the first track side wall so that the bearing is locked against the track element and movement of the carriage device along the track element is inhibited.

2. An aircraft wing according to claim 1, wherein the track element comprises a second track side wall, wherein the bearing comprises a second bearing side wall, and wherein the bearing and the track element engage in such a manner that,
when the bearing is aligned with the track element the second track side wall and the second bearing side wall are spaced from each other so that the linear movement of the carriage device along the track element is permitted, and
when the bearing is skewed with respect to the track element the second bearing side wall contacts the second track side wall so that the bearing is locked against the track element and movement of the carriage device along the track element is inhibited.

3. An aircraft wing according to claim 2, wherein the bearing is formed as slide bearing, and wherein the first bearing surface is formed as a first slide surface adapted to slide along the corresponding first support surface of the track element.

4. An aircraft wing according to claim 3, wherein the first track side wall and the second track side wall are arranged in a track recess of the track element in an opposite manner such that surfaces of the first track side wall and the second track side wall point to one another, and
wherein the first bearing side wall and the second bearing side wall are arranged on a bearing projection of the slide bearing in an opposite manner such that surfaces of the first bearing side wall and the second bearing side wall point away from one another.

5. An aircraft wing according to claim 4, wherein the first support surface is arranged on a side of the track recess, and wherein the first slide surface is arranged on a side of the bearing projection.

6. An aircraft wing according to claim 3, wherein the first track side wall and the second track side wall are arranged on a track projection of the track element in an opposite manner such that surfaces of the first track side wall and the second track side wall point away from one another, and
wherein the first bearing side wall and the second bearing side wall are arranged in a bearing recess of the slide bearing in an opposite manner such that surfaces of the first bearing side wall and the second bearing side wall point to one another.

7. An aircraft wing according to claim 6, wherein the first support surface is arranged on a side of the track projection, and wherein the first slide surface is arranged on a side of the bearing recess.

8. An aircraft wing according to claim 6, wherein the first support surface is arranged on the track element adjacent the track projection on a first side of the track projection,
wherein a second support surface is arranged on the track element adjacent the track projection on a second side of the track projection opposite the first side,
wherein the bearing recess is defined between a first bearing projection portion and a second bearing projection portion,
wherein the first slide surface is arranged on a side of the first bearing projection portion,
wherein a second slide surface is arranged on a side of the second bearing projection portion, and
wherein the second slide surface is adapted to slide along the corresponding second support surface.

9. An aircraft wing according to claim 2, wherein the bearing comprises
a roller arrangement having at least a first roller element, wherein a peripheral surface of the first roller element comprises the first bearing surface, and
the slide bearing, which comprises a first slide element having the first bearing side wall, and a second slide element having the second bearing side wall, wherein the first slide element and the second slide element are arranged in an opposite manner such that the first bearing side wall and the second bearing side wall face one another.

10. An aircraft wing according to claim 9, wherein the track element has a T-shaped cross section including
a first portion which is connected to the main wing and which extends away from a surface of the structure element of the main wing, and
a second portion which extends in parallel to said surface of the structure element and which has a first surface pointing away from the surface of the structure element, a second surface facing the surface of the structure element, as well as first and second side surfaces pointing away from each other and connecting the first surface to the second surface, wherein the first surface comprises the first support surface, wherein the roller arrangement has a second roller element the peripheral surface of which comprises a second bearing surface, and a third roller element the peripheral surface of which comprises a third bearing surface, wherein the second surface comprises a second support surface on a first side of the first portion and a third support surface on a second side of the first portion opposite the first side, wherein the second bearing surface is supported by and adapted to move along the corresponding second support surface, and the third bearing surface is supported by and adapted to move along the corresponding third support surface, and wherein the first side surface comprises the first track side wall, and the second side surface comprises the second track side wall.

11. An aircraft wing according to claim 10, wherein the roller arrangement comprises a fourth roller element that is arranged in line with the first roller element, a fifth roller element that is arranged in line with the second roller element, and a sixth roller element that is arranged in line with the third roller element, wherein alignment lines of the first and fourth roller elements, of the second and fifth roller elements, and the third and sixth roller elements extend in parallel to the track element, and wherein first and second slide elements are arranged between the first, second and third roller elements on the one hand, and the fourth, fifth and sixth roller elements on the other hand.

12. An aircraft wing according to claim 1, wherein a first ratchet mechanism is provided between the first track side wall and the first bearing side wall, wherein the first ratchet mechanism comprises a first ratchet component mounted to the first track side wall and a second ratchet component mounted to the first bearing side wall, wherein the first ratchet component and the second ratchet component are adapted to engage in a direction of engagement, when the first bearing side wall contacts the first track side wall, such that upon engagement a relative movement of the first and second ratchet components opposite the direction of engagement is inhibited.

13. An aircraft wing according to claim 12, wherein the track element comprises a second track side wall, wherein the bearing comprises a second bearing side wall, and wherein the bearing and the track element engage in such a manner that, when the bearing is aligned with the track element the second track side wall and the second bearing side wall are spaced from each other so that the linear movement of the carriage device along the track element is permitted, and when the bearing is skewed with respect to the track element the second bearing side wall contacts the second track side wall so that the bearing is locked against the track element and movement of the carriage device along the track element is inhibited, wherein a second ratchet mechanism is provided between the second track side wall and the second bearing side wall, wherein the second ratchet mechanism comprises a third ratchet component mounted to the second track side wall and a fourth ratchet component mounted to the second bearing side wall, wherein the third ratchet component and the fourth ratchet component are adapted to engage in the direction of engagement, when the second bearing side wall contacts the second track side wall, such that upon engagement a relative movement of the third and fourth ratchet components opposite the direction of engagement is inhibited.

14. An aircraft wing according to claim 1, wherein at least one of the first and second track side walls and the first and second bearing side walls is provided with an anti-slip surface.

* * * * *